(12) United States Patent
Ahola et al.

(10) Patent No.: US 9,866,340 B2
(45) Date of Patent: Jan. 9, 2018

(54) UNDERWATER TRANSCEIVER DEVICE, UNDERWATER COMMUNICATION SYSTEM AND RELATED COMMUNICATION METHOD

(71) Applicant: Suunto Oy, Vantaa (FI)

(72) Inventors: Tom Ahola, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 14/040,808

(22) Filed: Sep. 30, 2013

(65) Prior Publication Data

US 2015/0071280 A1 Mar. 12, 2015

(30) Foreign Application Priority Data

Sep. 10, 2013 (FI) ..................................... 20135911
Sep. 20, 2013 (GB) .................................. 1316719.2

(51) Int. Cl.
| | |
|---|---|
| H04W 56/00 | (2009.01) |
| H04J 3/16 | (2006.01) |
| H04B 13/02 | (2006.01) |
| H04J 3/14 | (2006.01) |
| H04J 3/06 | (2006.01) |

(52) U.S. Cl.
CPC ............ H04J 3/1694 (2013.01); H04B 13/02 (2013.01); H04J 3/0658 (2013.01); H04J 3/14 (2013.01); H04W 56/002 (2013.01); H04W 56/0015 (2013.01); *Y02B 60/50* (2013.01)

(58) Field of Classification Search
CPC ............ H04J 3/1694; H04J 3/14; H04B 13/02
See application file for complete search history.

(56) References Cited

U.S. PATENT DOCUMENTS

| 6,125,080 A * | 9/2000 | Sonnenschein et al. ..... 367/134 |
| 6,882,658 B1 * | 4/2005 | Rudd .................. H04B 7/2656 370/442 |
| 7,650,208 B2 * | 1/2010 | Basilico ......................... 701/21 |
| 8,374,825 B2 * | 2/2013 | Vock et al. ................... 702/188 |
| 2005/0074025 A1 | 4/2005 | Shao et al. |

(Continued)

FOREIGN PATENT DOCUMENTS

| EP | 2175575 A1 | 4/2010 |
| GB | 2452743 A | 3/2009 |

(Continued)

*Primary Examiner* — Mohammad Anwar
(74) *Attorney, Agent, or Firm* — Seppo Laine Oy (57) ABSTRACT

The invention concerns an underwater transceiver device, communications system and method of communicating sensor data underwater. The transceiver device comprises a sensor unit or a sensor connection for an external sensor unit for providing a sensor value and a communication unit functionally connected to the sensor unit or connection and comprising means for wirelessly transmitting the sensor value to another underwater device as data packets according to a timing scheme. According to the invention, the communication unit further comprises means for wirelessly receiving data packets of other underwater devices, and means for adjusting the timing scheme based on data packets received so as to avoid simultaneous transmitting of underwater devices. The invention enables energy-efficient and robust communications between diving equipment.

21 Claims, 6 Drawing Sheets

(56) References Cited

U.S. PATENT DOCUMENTS

| | | |
|---|---|---|
| 2005/0201340 A1 | 9/2005 | Wang et al. |
| 2009/0323716 A1* | 12/2009 | Chintalapudi .... H04W 74/0841 370/461 |
| 2011/0013480 A1 | 1/2011 | Koyama |
| 2011/0096703 A1* | 4/2011 | Nentwig .............. H04B 7/2643 370/294 |

FOREIGN PATENT DOCUMENTS

| | | |
|---|---|---|
| WO | WO0178831 A2 | 10/2001 |
| WO | WO2006102537 A2 | 9/2006 |
| WO | WO2009024925 A2 | 2/2009 |

\* cited by examiner

| SLOT | 0 | 1 | 2 | 3 | 4 | 5 | 6 | | 18 | 19 | 0 |
|---|---|---|---|---|---|---|---|---|---|---|---|
| ID | M0 | M1 | M2 | BC | 0 | 1 | 2 | | 14 | 15 | M0 |
| RX | ■ | ■ | ■ | ■ | ■ | ■ | ■ | ■ | ■ | ■ | ■ |
| TX | ■ | ■ | ■ | ■ | ■ | ■ | ■ | | ■ | ■ | ■ |

1 second

| Preamble | 20 bits | Zero bits |
| --- | --- | --- |
| Frame sync | 12 bits | |
| IAM | 1 bit | 0=Master 1=Slave |
| Master address | 3 bits | 7=Broadcast |
| Sensor address | 6 bits | 63=Broadcast/unassigned |
| Packet type | 2 bits | 0=One way, 1=Handshake, 2=ACK, 3=Time sync |
| TX rate | 2 bits | 1/1s, 1/2s, 1/4s, 1/8s |
| RX rate | 2 bits | 0, 1, 1/2, 1/4 x TX rate |
| Interleave | 2 bits | Slave only, 0...3 |
| Interleave sync | 1 bit | |
| Message length | 5 bits | 0...24 |
| Header checksum | 8 bits | 8LSB of the sum of 3 previous bytes |
| Message | 0-24 bytes | |
| Postamble | 8 bits | Zero bits |

Fig. 7

UNDERWATER TRANSCEIVER DEVICE, UNDERWATER COMMUNICATION SYSTEM AND RELATED COMMUNICATION METHOD

FIELD OF THE INVENTION

The invention relates to underwater communication between electronic devices. In particular, the invention relates to a diving communication system utilizing magnetic inductive coupling for communication of sensor data between devices. The invention also relates to underwater transceiver devices comprising sensor units and a method of transmitting sensor data in underwater circumstances.

BACKGROUND OF THE INVENTION

A diver needs to know the pressures of the gas tanks used during diving. A convenient way of showing the pressures to the diver is to communicate the pressures from each tank to a wearable diving computer attached to the divers' wrist, for example. In modern systems, pressure information is sent wirelessly from a tank sensor unit to the diving computer.

U.S. Pat. No. 8,275,311 disclose a method of the abovementioned kind. In the method, the pressure of a gas tank is measured and the pressure data is transmitted under water using a low first frequency to a diving computer. On the surface of the water, a second frequency higher than the first frequency is used for two-way telecommunication between the gas tank and the diving computer. The disclosed system can in principle handle several pressure data by individuating the pressure transmitters. However, in the case of several tanks collision of data and following communication problems cannot be avoided.

In addition, although a low frequency, such as below 1 MHz, e.g. 5 kHz disclosed in U.S. Pat. No. 8,275,311 is well suitable for underwater communications, it suffers from the drawback that the maximum usable bit rate is inherently low.

U.S. RE42218 discloses an underwater alert system having a transmitter carried by a first diver and a receiver carried by a second diver. The transmitter generates a wireless alert signal to get the attention of the second diver. There are also other underwater diver-to-diver alert systems and voice and message communicating systems available. In the disclosed alert system, the receiver may identify the transmitter by an electronic identity scheme which may utilize different frequency channels or electronic identity codes. However, since manual alerts are relatively infrequent, no collision preventing mechanisms are needed or disclosed.

Thus, there is a need for improved underwater communication systems and devices in particular for simultaneous monitoring a plurality of diving gas pressures, but also for other potential needs.

SUMMARY OF THE INVENTION

It is an aim of the invention to solve at least some of the abovementioned problems and to provide an improved underwater transceiver device. A particular aim is to provide a transceiver device which can be used simultaneously with other similar transceiver devices. One specific aim is to provide a diving gas pressure sensor transceiver device.

It is also an aim of the invention to provide a novel underwater communication system and a method of communicating sensor data under water.

The invention is based on the idea of providing a transceiver device having the capability to listen to signals of other transceiver devices and to adjust its own timing of transmitting based on the signals received. The transceiver has a communication unit capable of transmitting data in packets according to a timing scheme, for example once every couple of seconds. The timing scheme may for example be adjusted such that the data packets are transmitted in synchronized relationship but not simultaneously with another transmitter. The scheme may for example be provided with specific time slots allowed for transmitting of the devices. There are two principal ways of achieving the adjusting of the transceivers. First, they may self-adjust their timing scheme based on signals of similar devices. Second, they may receive specific adjustment orders from a master device, which controls some or all of the transceivers. The master device may be a diving computer, for example.

The invention also provides a communication system in which the transceiver devices are one part. There is also provided a monitoring device, such as a wearable diving computer capable of receiving the data packets of the transceiver devices. The diving computer is configured to listen to data packets of the transceiver devices, now being temporally adjusted in non-simultaneous configuration according to the invention.

The communication between the devices of the invention is preferably based on magnetoinductive waves. For this purpose, there may be a suitable loop antennas in the communicating devices for producing and sensing magnetic field. In underwater circumstances, electric field produced by such antennae is low and attenuated quickly in the near field, whereby communication between the devices is practically magnetoinductive.

The present method comprises synchronizing timing schemes of at least two transceiver devices by transmitting a signal from a first device, receiving the signal on a second device and adjusting the timing scheme of the second device based on the time of receipt of the signal to avoid collision of signals and to put the signals in well-defined temporal order. The method is most advantageously carried out such that there are a plurality of allowed time slots for transmitting and the devices are adjusted to use successive time slots. Thus, the short data packets of the devices form together a longer signal, which can be received by the monitoring device during one listening period. The signal comprises the data packets successively ordered according to the time slots, there typically being a time margin between the data packets to ensure that there is no overlap of data packets.

In one preferred embodiment, the present device can automatically shift between a two-way communication network mode with one or more network master devices and a one-way self-organizing sensor network mode without a master device.

More specifically, the invention is defined in the independent claims.

The invention has considerable advantages. First, it helps to improve reliable listening of the transmitted signals since transmission collisions are avoided by synchronizing the timing schemes of the transmitters. Second, it helps to reduce the energy consumption of the listener of the transmitted signals, because it will better know when to expect signal and can turn its radio on accordingly for shorter periods. Third, the invention helps to increase the amount of data transmitted and received, because the transmitted signals are sent well ordered and at well-defined time slots and not at arbitrary moments. Thus, more bits can be fitted with a given time window.

Dependent claims focus on selected embodiments of the invention.

According to one embodiment, the invention provides an underwater transceiver device comprising a sensor unit for providing a sensor value and a communication unit functionally connected to the sensor unit and comprising means for wirelessly transmitting the sensor value to another underwater device as data packets according to a timing scheme stored in a memory of the device. The communication unit further comprises means for wirelessly receiving data packets sent by other underwater devices. The communication unit is further capable of adjusting the timing scheme based on data packets received so as to avoid simultaneous transmitting of underwater devices.

In an alternative embodiment, the sensor value can be provided through a sensor connection for an external sensor unit arranged in the transceiver. The sensor connection may comprise a connector for cable connection or wireless sensor connection means.

The means for adjusting are preferably configured to adjust the timing scheme based on time of receipt or content of data packets received. These two are different but non-exclusive approaches for the adjustment. That is, the adjustment may be based on both the time of receipt and content of one or more data packets received.

In the first approach, the means for adjusting are configured to self-adjust the timing scheme so as to synchronize the means for transmitting with the device whose data packed was received. If more than one data packets are received from two or more devices, the adjustment may be based on temporal distribution of the data packets. As a result of this adjustment, the devices start transmitting their associated sensor values at different times, synchronized with each other.

In a preferred embodiment, the timing schemes of each of the devices comprise a preconfigured set of cyclically repeating time slots allowed for transmitting. Each device uses one time slot. The means for adjusting are configured to select a free time slot, preferably the next free time slot, for transmitting. For example, if a device notices through receipt of signals of other devices that time slots 1 and 2 reserved for the transceivers are already used but time slot 3 is not used, it may take the next free time slot 3.

The duration of the repeating cycle of the time slots, as well as the number, starting times and duration of the time slots is preferably preconfigured to each transceiver device belonging to the communication system. In addition, the time slot allocated for use of the particular device is configured or configurable to each device.

The most important parameter to be adjusted in a transceiver device during its use is the timing, most preferably the time slot from a set of time slots, to be used for transmission, according to the abovementioned principles. Other parameters of the temporal transmission scheme can be more permanently configured and need not be amended during or at the start of each diving performance. However, it is not excluded that these parameters be adjusted during the performance too. Practical models for carrying out the self-adjustment process are described later in this document in more detail.

In the second approach, the transceiver device acts as a slave device and there is a master device in the system. The communication means are adapted to receive a data packet from the master device, the data packet comprising master status information and timing scheme command. The means for adjusting are adapted to adjust the timing scheme based on the data packet received. To concretize the idea, the master data packet may include an "I am master" data section, identifiable by the transceiver, and "Take time slot number N" command, also identifiable by the transceiver. The transceiver obeys the instructions and starts to transmit its sensor value using time slot N.

In the master-slave mode, there is typically a time slot reserved for the transceivers to announce their presence to the master device. Thus, the master device receives signals of all the transceiver and is able to allocate an individual time slot for each transceiver.

The master device is typically a diving computer or another monitoring device worn or held by a diver or installed into diving-aid equipment. It is typically equipped with a display unit, whereas the transceivers may also be without displays. However, it should be noted the one of the transceivers may also take the role of a master and allocate the time slots for itself and the other devices.

As mentioned above, the first and second approaches may also be combined for example such that the adjustment is made based on the content and time of receipt of the data packet. For example, if there are two groups of devices, such as gas pressure sensor devices and location sensor devices, the devices may identify themselves in their data packets such that other transceivers may take a next free time slot within a group of devices. This allows for the first group to take the first time slots 1 . . . N and the second group the time slots N+1 . . . M, without scrambling the time slots between the different types of devices. Of course, if a master device is present, it may take care of the allocation in a similar way.

According to a preferred embodiment, the data packets comprise at least transceiver (or sensor) identification information and sensor value information. Each transceiver (or sensor) is preferably provided with a unique ID code, which is implemented in the hardware or software level of the device. Based on this ID, the other devices in the communication system will be able to identify the device and distinguish its transmissions for other transmissions. Optionally, the data packets comprise also sensor type information, sensor battery level information and/or error correction information. Detailed examples will be given later.

As mentioned above, the timing scheme used by the transceivers may comprise a time slot reserved for receiving data packet of other underwater devices so as to allow for registering of new devices. This time slot should preferably be used for transmission only by devices, which have not yet synchronized their transmission scheme with the other devices.

To describe an exemplary process in a general level, a transceiver device may be configured, preferably immediately after powering them on, to listen to data packets of other devices, upon receipt of data packet of a predefined first type (master type), to adjust the timing scheme according to instructions contained in the data packet of the first type, in the absence of data packets of the predefined first type and upon receipt of data packets of a predefined second type (equivalent type) at a first time slot, to adjust the timing scheme such that the transmission of data packet takes place at a second time slot different than the first time slot, to start transmitting according to the adjusted timing scheme.

The first and second time slots referred to above are preferably successive, i.e., there are no time slots between them. The first and second time slots are also preferably such that there are no free time slots before them in the cycle of time slots. That is, the transmitting time window is populated from the beginning up to the level necessary for each transceiver to be able to transmit.

According to one embodiment, the communication between the devices utilizes magnetoinductive waves and takes place at a low frequency, in the range from 1 kHz to 10 MHz, in particular 1 kHz to 1 MHz. Such a frequency range is suitable for underwater communications and has a reach up to couple of meters with practical power levels. The drawback of a low frequency is that the channel bandwidth is limited. Thus, the total data transfer capacity of the multi-device network is limited too. However, by means of the invention, the available time is effectively used and sensor value update interval can be kept reasonable, for example from 1 s to 8 s.

According to one embodiment, the communication system does not use frequency shifting.

That is, the communication unit is adapted to transmit and receive said data packets at a constant frequency. By means of the invention the data packets and bits of all the transceivers can be nicely ordered in successive configuration at the selected constant frequency, whereby listening is also simple.

In a preferred embodiment, the sensor unit is a diving gas pressure sensor unit and the sensor value is a gas pressure value (including any other value proportional to the gas pressure or a derivative of a gas pressure value). Such sensor in located in a gas tank of a diver and the transceiver unit can be integrated with the sensor unit to make a sensor transceiver device. However, the sensor may communicate its data via a cable or wirelessly also to a separate transceiver, which further joins the communication system herein described.

Alternative sensor types include a location sensors (sensor value is a location value), proximity sensors (said sensor value is a distance value), heart beat sensors (sensor value is a heart beat or heart rate value), ambient pressure sensors (sensor value is an ambient pressure value or depth value), geocache finders/detectors (sensor value is a geocache detection signal) and geocache target pods (sensor value is a geocache "password" proving finding of the geocache). All types of sensors may join a single communication system herein described, either as permanent members (like a gas pressure sensor) or as visitors (like a geocache pod).

The transceiver devices preferably comprising a memory unit with a memory portion for storing wirelessly reconfigurable operation settings, such as timing scheme information, identification information or communication protocol information. The reconfiguration of there parameters is carried out by a master device, most notably a computer and/or a diving computer, coupled to the transceiver device.

According to one embodiment, the present underwater communication system comprises at least two transceiver devices as described above or later in more detail. In addition to the transceivers, there is a monitoring device comprising means for listening to data packets of the transceivers during a listening period.

The listening period is set to cover the whole duration of a preconfigured timing scheme used by the transceivers or a part of it. For example, if the number of transceivers that have joined the system is less than the maximum allowed number of transceivers, the listening period may be reduced to cover only the populated part of the scheme, to save energy. That is, the monitor may be adapted to be between the listening periods in a resting state consuming less energy than during the listening periods. If desired, the monitoring device may occasionally listen over the whole scheme in order to note whether there are other devices (potential new joiners) within the range transmitting at some random time.

In the preferred embodiment, the timing schemes of the transceiver devices each comprise a limited equal number of transmission time slots and said transceiver devices are arranged to adjust their temporal transmission schemes to populate successive transmission time slots. Respectively, in the monitoring device, the means for listening to data packets are adapted to listen to the data packets of all the populated transmission time slots during a single listening period.

According to one embodiment, the monitoring device is incapable of transmitting to the transceiver devices. Thus, the monitor is a listener only. This embodiment allows for very low energy consumption for the monitor device. This embodiment is preferably combined with the first adjusting approach of the transceivers as described above. In this approach, the transceivers are capable of self-adjusting their timing schemes based on data packets received from each other and there is no need for a master device.

According to an alternative embodiment, the monitoring device is capable of both listening and transmitting data to the transceivers. This embodiment is preferably combined with the second adjusting approach of the transceivers as described above. In this approach, the monitoring device is a master device giving transmitting timing command as data packets, and potentially other commands too, to the transceiver devices once they have announced their presence to the master device.

According to a preferred embodiment, the monitoring device is a wristop diving computer wearable on a wrist of a diver. In an alternative embodiment, the monitoring device is a diving mask. Both devices may comprise integrated display units for displaying the sensor data provided by the transceiver devices. There may also be user interface means for allowing the used to command the monitoring device and/or the transceiver devices.

According to one embodiment, the transceiver device comprises means for determining whether a master device is present in the system and to automatically change its mode of operation from a self-organized network mode with only similar devices to a master-slave network mode and vice versa, depending on the presence of a master device. According to one embodiment, the user can select the desired mode of operation or such automatic (adaptive) mode.

The present method of communication of sensor data relates to the underwater communication system as described above and comprising at least two transceiver devices each being arranged to receive sensor data from at least one sensor unit integrated or functionally connected to the transceiver device and each comprising a programmed repeating timing scheme having a limited number of time slots allowed for transmission of data packets. According to one embodiment, the method comprises
  powering on the transceiver devices,
  transmitting a signal from at least a first transceiver device as an data packet according to timing scheme of the first transceiver device,
  receiving said data packet in a second transceiver device,
  synchronizing the timing scheme of the second transceiver device with the timing scheme of the first transceiver device based on the time of receipt of the data packet from the first transceiver device such that the first and second transceiver devices use successive time slots for transmission of data packets, transmitting sensor data containing signals from said first and second transceiver devices according to first and second timing schemes, respectively.

In another embodiment, the method comprises
powering on the transceiver devices,
transmitting a presence signal as a data packet from at least a first and a second transceiver device,
receiving said presence signals in a master device,
allocating an individual timing time slot for the first and second transceiver device in the master device,
transmitting a timing scheme adjustment command dedicated to at least the first or the second transceiver device comprising information on the allocated time slot to the first and second transceiver devices,
adjusting the timing scheme in at least one of the first and second transceiver devices based on the timing scheme adjustment command,
transmitting sensor data containing signals from said first and second transceiver devices according to their individual timing schemes.

In a typical further embodiment, the monitoring device receives the sensor data containing signals and optionally displays them on a display unit.

Preferably, the sensor data containing signals are received in a receiver, such as a monitor unit (which may but needs not act also as a master unit), as a ordered data stream formed of bits of data packets of the first and second transceiver devices in said successive time slots. The data stream may be essentially a single continuous stream, but typically there are short margin periods between the data packets to prevent data collisions in the case of synchronization inaccuracies or temporal drift of transmitters. The monitoring device may listen to the ordered data stream during a listening period in one go or in suitable periods, for example corresponding to the length of the data packets. In one embodiment, the monitoring device is adapted to go into a low-energy state between the periods and to be awake for listening during the periods.

Definitions

The terms "transceiver" or "transceiver device" as herein used mean a device capable of receiving and transmitting data using magnetic inductive coupling, preferably as digital data packets (bursts) having a predefined packet form defined by a communication protocol.

The term "timing scheme" means a set of information and rules that define when a device is supposed to transmit data to other devices, i.e. a temporal transmitting scheme. A simple concertized example of a timing scheme is "transmit data packet having a length of maximum X ms once every N seconds, starting now". In practice, the timing scheme is often a more complex set of background information and rules, including the definition of general communication time frame, transmitting window, time slots and interleaving instructions, like "The scheme presently used consists of N time slots each having a length of X ms. The first M time slots are reserved and next K time slots allowed for transmitting. This device presently uses time slot L. No interleaved operation." The timing scheme is adapted to be repeating in each device in the system, i.e. transmitting of each device at the desired moment takes place at predefined, preferably constant, intervals. Similarly in listening devices, listening takes place in repeating manner with the same intervals. The interval may be equal to the time frame of communication or it may be also longer, such as in interleaved operation, as will be described later. The interval may also be prolonged to save energy such that there is a pause in between.

"Adjusting the timing scheme" means changing the set of information and rules in one device to affect the communication between the device and other underwater devices.

A "time slot" is a section of a transmitting window allowed for devices to transmit their data. A "populated time slot" is a time slot that a device in the system is using for transmission. A "free time slot" is a time slot not used by any device in the system. "Next free time slot" is a free time slot than comes chronologically next to populated time slots. An "allowed time slot" is a time slot that is intended for transmitting of transceiver devices. A "reserved time slot" is intended for other purposes, such as master device transmissions or registering of new devices.

"Data stream" is a set of individual data packets of different devices sent at different, preferably successive, time slots in a synchronized way.

A "monitoring device" is a device capable of receiving and storing and/or displaying data from the transceiver devices.

A monitoring device or a transceiver may be a "master", meaning that it may at least partly control other devices in the system, most notably their temporal transmission schemes. A "slave" is a device that takes orders from a master.

"Listening" by a device means for the device to be in a state in which it can receive and detect data packets potentially transmitted by one or more other devices. A "listening period" is a period during which a device listens to other devices of the system. Listening periods are in synchronization with the transmitting periods of the transmitting devices of the system.

A "sensor" is any device that reacts to changes in physical conditions interacting with the device (e.g. a gas pressure sensor, temperature sensor, depth sensor) or is capable of detecting and interpreting signals sent by other devices that are not part of the actual communication system herein described (e.g. satellite positioning sensor or geocache detector) or taking (sensing) input from a user. Thus, the word sensor is to be interpreted broadly.

Next, embodiments and advantages of the invention are described in more detail with reference to the attached drawings.

DETAILED DESCRIPTION OF EMBODIMENTS

Figure 1:
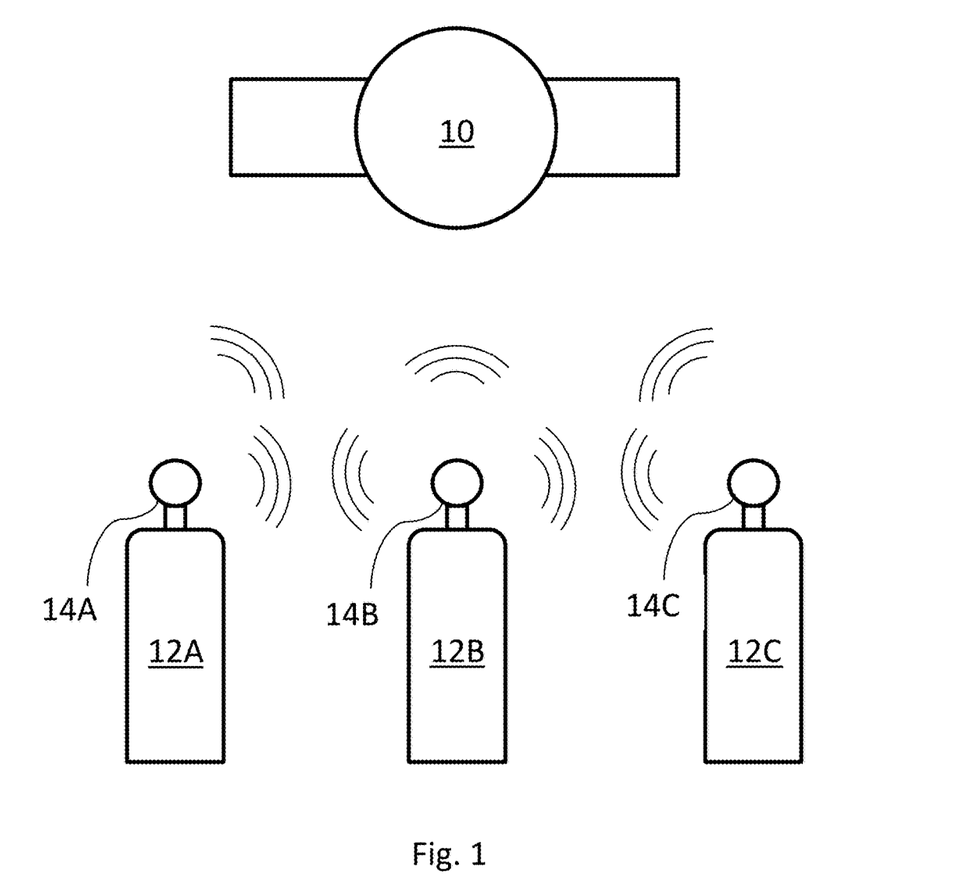
FIG. 1 shows a schematic overview of the present system exemplified with three gas tanks equipped with pressure sensor transceivers and a diving computer as a monitor device.

FIG. 1 illustrates an embodiment with three gas tanks 12A, 12B, 12C having transceiver sensor devices 14A, 14B, 14C mounted thereon. The sensor portions of the devices 14A, 14B, 14C measure the gas pressure in the tanks 12A, 12B, 12C and provide sensor values to transceiver portions of the devices 14A, 14B, 14C. The devices 14A, 14B, 14C transmit their respective sensor values to other devices nearby. There is also provided a monitor device 10 in the form of a diving computer.

Figure 2:
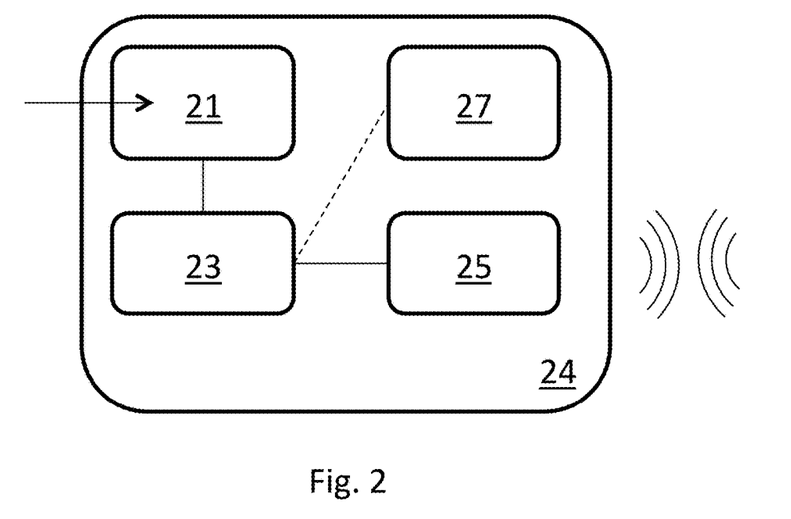
FIG. 2 shows a block diagram of a transceiver device according to one embodiment of the invention.

FIG. 2 illustrates a transceiver device 24 as a block diagram. The device 24 comprises in IO unit 21 capable of receiving a sensor signal from a sensor. The IO unit is functionally connected to a processing unit 23. The processing unit 23 is further connected to a two-way communication unit 25 capable of transmitting the sensor value as an magnetoinductive signal and for receiving data from other devices, and for potential other communication purposes. The processing unit 23 comprises a memory for temporary storage of the sensor data and for internal software. The processing unit comprises necessary hardware and software means for defining and utilizing a timing scheme for communication with other devices, as well as software means for adjusting the timing scheme.

There may also be provided a display 27 for illustrating the sensor value.

Figure 3A:
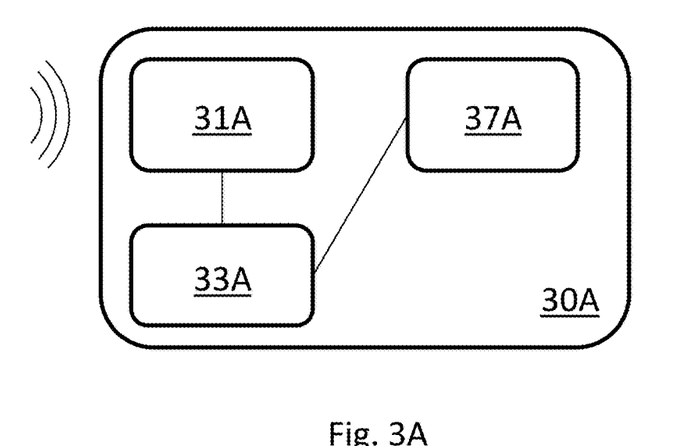
FIG. 3A illustrates a block diagram of a receiver-only monitor device according to one embodiment of the invention.

FIG. 3A illustrates a monitor device 30A functioning as a receiver only. The device comprises a one-way communication unit 31A capable of receiving data from other devices. The device 30A further comprises a processing unit 33A functionally connected to the communication unit 31A and a display 37A functionally connected to the processing unit 33A. The processing unit 33A is capable of processing data incoming from the communication unit 31A and visualizing the same on the display 37A.

Figure 3B:
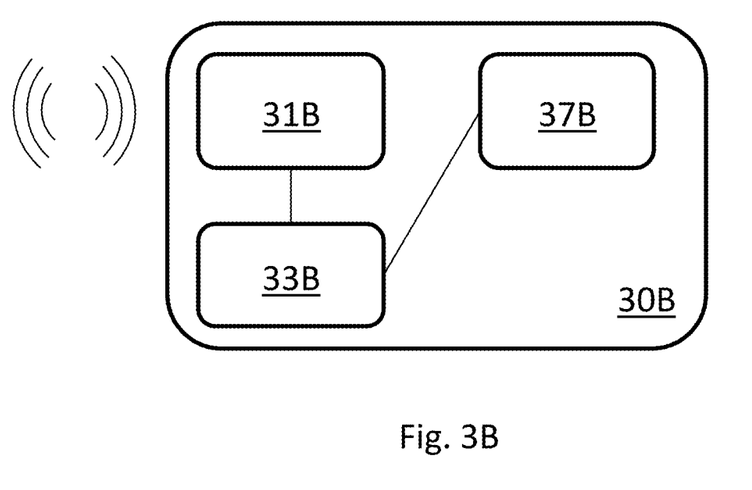
FIG. 3B illustrates a block diagram of a transceiver monitor device according to one embodiment of the invention.

FIG. 3B illustrates a monitor device 30B being mostly similar to that of FIG. 3A but including a two-way communication unit 31B. This monitor device 30B can operate as a master device. Its processing unit 33B is additionally capable of providing commands to the communication unit 31B for transmission to slave devices in the system. Also this processing unit comprises necessary hardware and software means for defining and utilizing a timing scheme for communication with other devices. In addition, it comprises the necessary logic to allocate free transmitting slots for the slave devices upon registering them as participants to the communication system. The display 37B can be configured to display data received from one or more slave devices or information derived therefrom.

Next, embodiments of the invention is described more clearly first in a master-slave hierarchy and then in a masterless (equivalent device) hierarchy. The system may be designed to work in one of these hierarchies only, but is preferably designed such that when a master is present, it uses the master-slave hierarchy and in the absence of a master, it uses equivalent device hierarchy. This is called adaptive mode.

Figure 6:
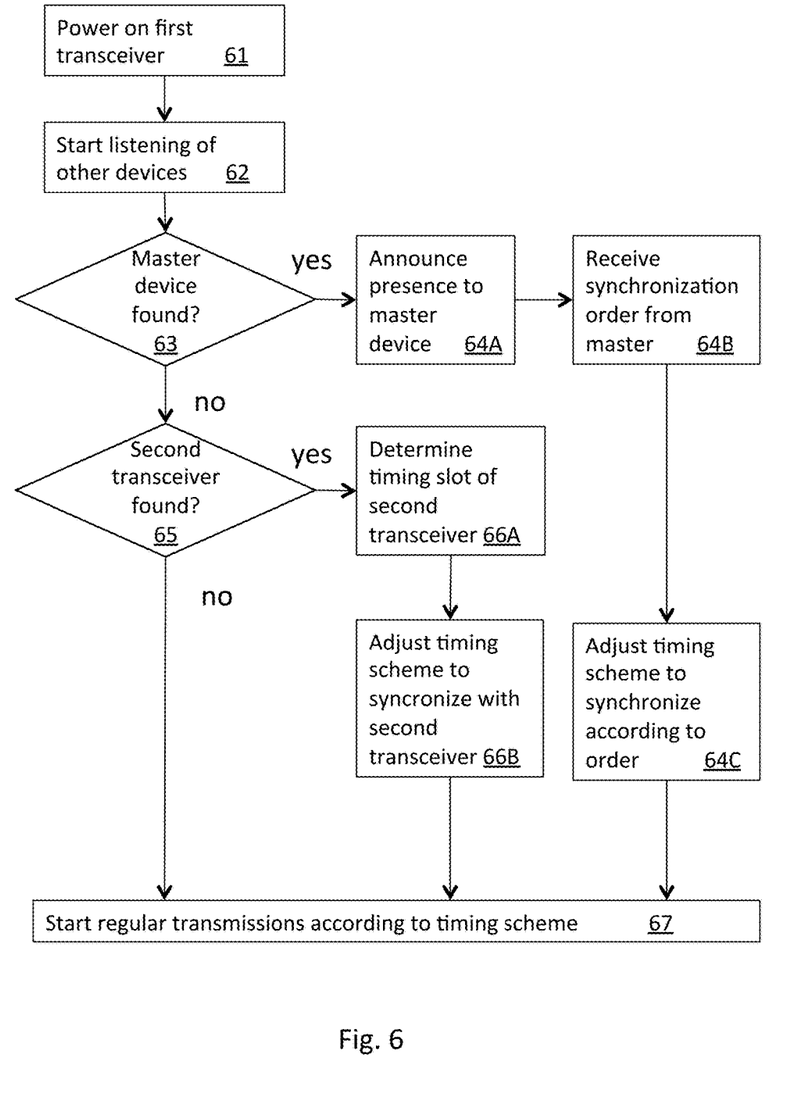
FIG. 6 shows as a flow chart the operation of a transceiver device according to one embodiment of the invention.

Before going into details of the hierarchies, FIG. 6 gives first an overview of the method as a block diagram of the adaptive mode according to one embodiment. In the first step, phase 61, a first transceiver device is turned on. In the next phase 62, it starts to listen to network activity within its range. If it picks up a message from a master device in phase 63, it proceeds to transmit a presence message in phase 64A. The master picks up the presence message and determines a free transmission time slot for the first transceiver. The slot information is sent to and received by the first transceiver device as synchronization order in phase 64B. Following the order, the first transceiver adjusts its transmission scheme according to the order in phase 64C, and proceeds to regular transmissions using the newly received time slot, i.e. to phase 67.

If the first transceiver does not find a master but finds an active (already transmitting) second transceiver in phase 65 by receiving a message from the second transceiver, it picks up the moment of receipt of its message and transmission time slot from the message in phase 66A and synchronizes itself based on this data in phase 66B by adjusting its transmission scheme. There may also be other transceiver present and found and their reserved time slots are taken into account in a similar way. Then, the first transceiver proceeds to phase 67, i.e., regular transmissions using the newly self-adjusted time slot.

If the first transceiver does not detect any network activity during its predefined listening period, it may proceed to regular transmission phase 67 using its default transmission scheme.

The transceiver devices preferably contain a unique ID, which can be used for secure identification thereof. They may also have a short reprogrammable ID for allowing more compact regular messages and savings in time and energy. In addition, the devices preferable have a programmable friendly name such as "John's gas X". The friendly name can be programmed directly to the devices or, even more preferably, to a master monitor device before use of the system so that the monitor device can transmit the friendly name to the transceiver devices when a connection with them has been established. In both cases the transceiver device may store the friendly name in nonvolatile memory so it can provide name identification if it is started at a later time, possibly among unfamiliar other devices. Alternatively, in particular if no introduction of foreign devices to the system is allowed during a dive, the friendly name may be used by the user interface monitor device only.

According to one embodiment, the master device and/or the transceiver devices have means for coupling to a computer or a smart phone for programming the friendly name using the computer or smart phone. The means for coupling may be can also be used for other programming and/or monitoring functions. The coupling may be wired or wireless.

Now, the hierarchies are described in more detail.

Master-Slave Network Hierarchy

Devices in the network are categorized into two categories: masters and sensors, the sensors herein being the slave transceiver devices. Each device has a broadcast address (e.g. 6 bits long), which may initially be a default address or unassigned. A master controls the network, defines its own timing, gives devices their identity and resolves conflicts. Sensors are more simple devices typically with less energy available. They typically transmit measured data to the master to be displayed to the user. A sensor can also receive data from the master, and besides taking in timing instructions, it may function as a controller, actuator or display in some embodiments.

In the typical use-case of single-frequency systems, all devices within the range of the wireless network ideally belong to the same network. It can happen that two or more separate networks are brought close to each other. These separate networks have each one master with one or more sensors. When they are in close proximity, they might interfere. Sensors and masters from the different networks are likely to have overlapping addresses and thus the messages and commands might be confused. They are most likely also unsynchronized in time. The master should detect this and synchronize the networks and combine them to one. The synchronized network can then contain two or more masters.

Any master can listen to any sensor and also transmit to it. However, sensors typically only obey commands from their own master. One of the masters in a combined network is assigned as a senior master, which dictates the network synchronization. Masters and sensors may have identical data packet formats but they are distinguished by their data content, most simply an IAM bit. All devices also have a unique identifier with a fixed bit length (e.g. 32 bits) associated with the hardware device. The senior master may for example be the one with the smallest identifier (e.g. the unique ID) when converted into a number.

Time-Slot Mechanism

Figure 4:
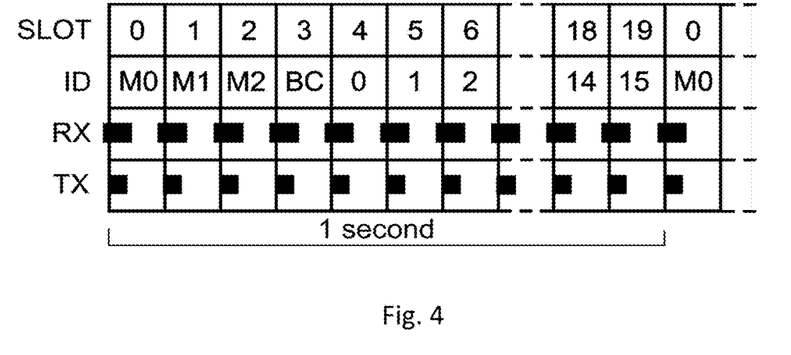
FIG. 4 shows a timing scheme of the communication system and its components according to one embodiment of the invention.

Next, the preferred timing scheme mechanism is described with reference to FIG. 4.

In this example, a reference time frame having a length of 1 second is used. The length may be e.g. 0.1-10 seconds in practice, naturally requiring scaling of other time parameters introduced hereinafter accordingly. The time frame is divided into 20 time slots, each 50 ms long. A master only transmits in slots M0, M1 or M2. Sensors only transmit in slots 0 . . . 15. There is also a broadcast slot (BC) where new sensors can announce their presence to the master. The master sets the time frame by its transmission. Sensors listen and synchronize to it.

The duration of the transmission of one packet is 8-30 ms, i.e., shorter than the time slot, depending on the packet length (0 to 24 bytes of payload data). Transmission starts at the beginning of a time slot and stops when the complete packet has been sent.

The reception period starts slightly before the beginning of the time slot, to allow for some jitter between device time synchronization. To save energy, the amount of time to pre-listen can be adaptive and be dynamically reduced if it is detected that transmissions are arriving steadily at correct time. The pre-listen time can be anything between 1 to 30 ms. Reception should stop when a complete packet has been received or at latest 50 ms after the start of the transmission slot, unless the receiver is in a continuous receive mode to capture any transmissions from unsynchronized devices.

In one embodiment, the four last significant bits of a sensor address determine the transmission time slot it can use. These bits should be anything from 0 to 15, which directly match the slot ID they are allowed to transmit in.

Interleaved Operation

As one may note, there are 64 valid sensor addresses and only 16 time slots in the example described above and four sensors can therefore potentially transmit in the same time slot.

An interleave system supporting a plurality of sensors in the same time slot without risk for interference will be described below.

Interleaving means reducing transmission rate of one sensor and alternating between different sensors in one slot. In our example, the 64 potential sensors can be active simultaneously if each one transmit only once per four seconds or less frequently.

Figure 5:
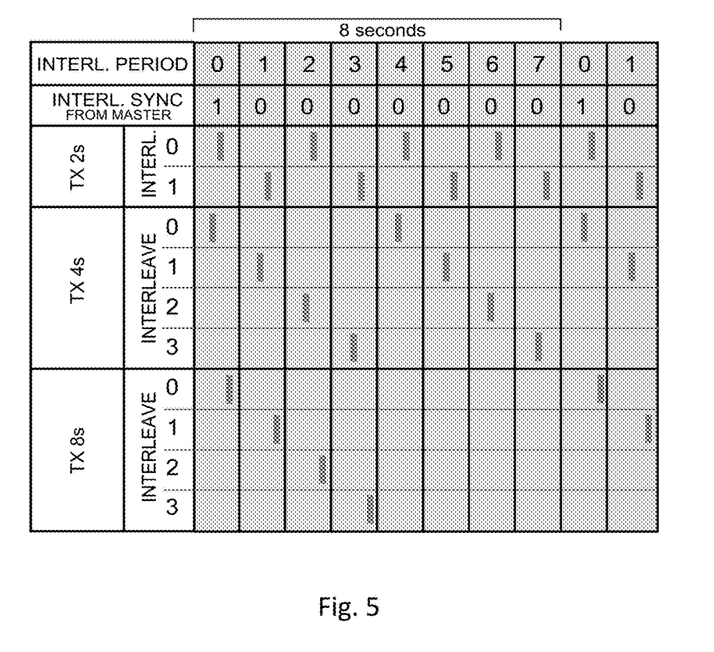
FIG. 5 illustrates a timing scheme of the communication system and its components in interleaved operation mode according to one embodiment of the invention.

FIG. 5 illustrates the interleaved operation for transmit rates of 2, 4 and 8 seconds. The interleave operation is activated by the master, by sending timing scheme adjustment commands to the sensors. The master itself transmits or receives when a sensor is expected to receive or transmit, respectively. Thus, the master's interleave bits are not used. However, the master transmits an interleave sync bit. This sync bit, when set to 1 in a message transmitted by the master, indicates that the current 1-second period of timeslots, is the first one of eight periods in the interleave framework. These interleave periods are named P0, P1, P2, . . . P7. If the master has nothing else to transmit, it can transmit a time sync packet or a HELLO message. It is recommended that the master sends at least some data packet in every interleave-period P0 so that other devices in the network are able to synchronize themselves.

Interleave is possible when TX rate is set to an interval of 2 s, 4 s or 8 s. If TX rate is set to a 2 s interval, the interleave parameter, as transmitted by the sensor, can be 0 or 1. If it is 0, the sensor transmits in P0, P2, P4 and P6. If it is 1, the sensor transmits in P1, P3, P5 and P7. With a 4 s or 8 s TX interval the interleave parameter can be from 0 to 3. The sensor then transmits in the respective period P0 to P3, and with a 4 s TX interval also in P5 to P7, respectively.

Interleave also affects the receiver of the sensor. If RX rate is 1 (equal to TX rate), the sensor receives in the same interleave period as it transmits. If RX rate slower than TX, the sensor receives in the same interleave periods as it transmits, but only every second or every fourth time. To indicate when the sensor is receiving, it sets the interleave sync bit to 1 in the normally scheduled transmission preceding the interleave period in which it listens for incoming data.

Data Packet Format

Figure 7:
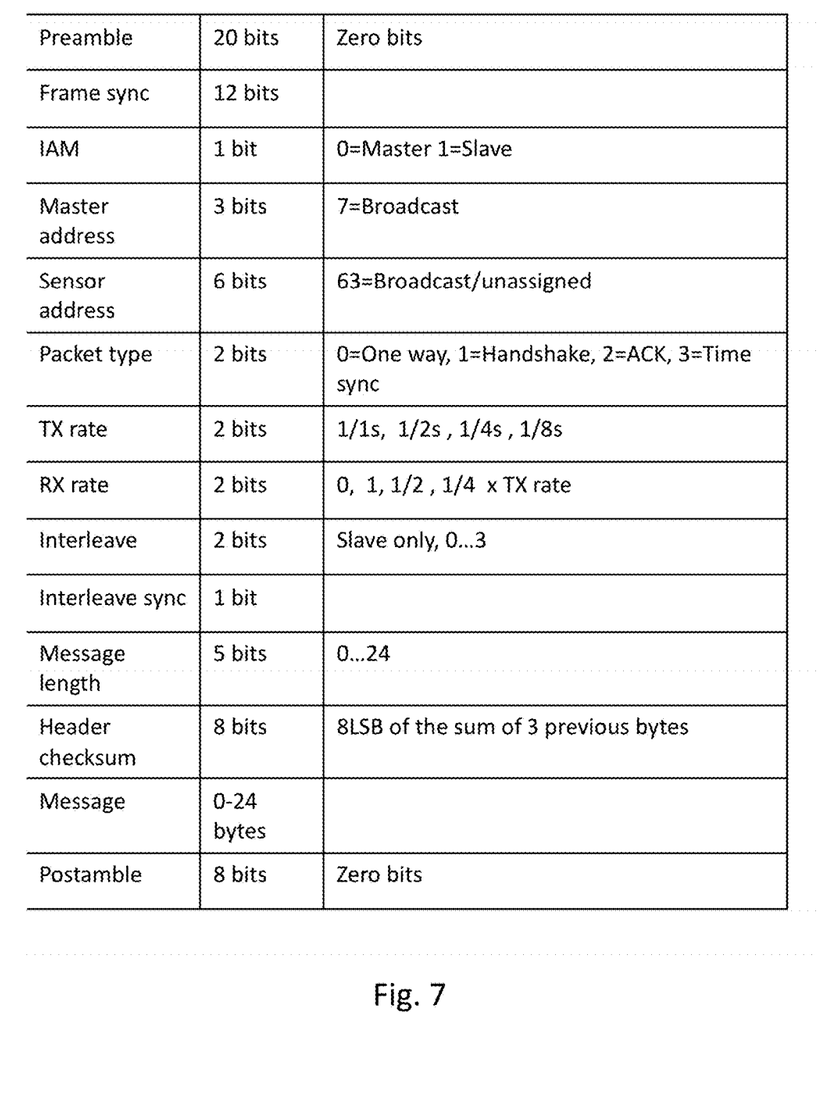
FIG. 7 shows as a table exemplary data packet format usable in connection with the invention.

FIG. 7 illustrates an exemplary general data packet format usable in connection with the present invention, allowing a variety of the described functions, adjustments and settings to be carried out. As understood by a skilled person, the format and in particular the bit lengths can be designed and chosen in a different way.

The data packet format herein described is a compromise where enough data is included for a connectionless message to be successfully interpreted but packet length is minimized to reduce transmission time and energy. The preamble is needed to achieve symbol (bit) clock synchronization. A longer preamble ensures that there is enough time to establish synchronization before data throughput begins. The frame sync word synchronizes the data frame and indicates the start of a packet. The IAM bit indicates if the transmission is from a master or a sensor, followed by the addresses of both sender and receiver. The packet type bits indicate one of four packet types. TX and RX rates and interleave data is included in every message so that rates can be quickly dynamically adapted and determined by any receiver, including one not targeted, so that correct timing can be followed without negotiations. The header also includes a message length and a simple checksum of the header data. The message can be 0 to 24 bytes long and should include its own checksum.

Dynamic Address Allocation

A master device may have a default address, such as 0. In case another master comes into range, it might be useful for a master to change its address. However, it is not always necessary. The address of the master determines the transmission slot it uses to send messages or commands to sensors or other masters. Several masters can transmit using the same address in the same slot if they do it at different times. This works, if transmissions are infrequent, and there is no risk for confusion, using the unique ID numbers, for example. But if a master desires to separate master addresses, it can send a change address command to the other master. If the other master has a higher value of its unique ID number it has to obey and confirm the change. It also needs to inform the address change to the sensors, if they might need to receive something from the master in the future from a new address and new slot. It the other master has a smaller unique ID number it will not obey, but reject and become the senior master. The senior master will then request an address change.

When a sensor is started, it can either start with a default broadcast address, or remember its address from previous use. It could also have an address determined in some other way (e.g. random). The procedure used can be specified in the software level. When a master receives a packet from a sensor with a broadcast address it can start an address allocation procedure, giving the sensor a specific address. For example, matching unique ID can automatically initiate this procedure. In other cases the user could decide if the sensor will be addressed. When the address allocation is done, the sensor will belong to this master and in most cases will only obey to commands from this master.

Time Synchronization

The master determines the network timing. When the master is started, the network clock starts. But when a sensor is started, it will initially be timing-wise unsynchronized to the network. There are two ways the sensor can achieve synchronization. One way is for it to start transmitting and waiting for a master to pick up its transmission and issue a synchronization command. This transmission can be more or less frequent, with intermissions and adapted to suit a proper energy saving strategy. The other way is for the sensor to listen for other network activity. If it picks up another sensor or a master, it will immediately be able to synchronize itself based on time of receipt and potentially the address of the sender of the packet received. Subsequently it can start transmitting sensor data or HELLO messages to catch attention from a master.

The listening for network activity can be duty cycled and adapted to a proper energy saving strategy. Depending on wireless technology it might be more energy efficient to listen or to transmit. Which initial synchronization method to use can be specified in the software level, bearing in mind that gaining synchronization by listening and avoiding unsynchronized transmissions is more robust and causes less interference. It is recommended that the master transmits at least occasionally, for example once per eight seconds, a HELLO message at the first second period of eight in the interleave sequence, for sensors to be able to pick up the correct timing and interleave. This was explained in the interleave operation description above.

According to one embodiment, the transmit and listen intervals of the transceivers are asymmetric. For example, the transceivers (sensors) may listen to incoming messages less frequently than they are sending sensor data to save energy (e.g. at every $2^{nd}$-$24^{th}$ cycle).

Equivalent Device Hierarchy

The present technology supports operation without a master, i.e. in equivalent device hierarchy. Most of the mechanisms and operational principles described above in connection with master-slave hierarchy apply also in equivalent device hierarchy, either as such or in modified form. For example the relevant portions of the time slot mechanism, data packet format and dynamic address allocation are applicable as such. In this mode, there are, however some non-used time slots and data fields. However, these become immediately necessary, if a master joins the system and takes control of other devices. If the system is designed to operate in equivalent device mode only, these time slots and data fields may be removed from the software configurations of the devices. It is also most convenient to implement interleaved operation in the master-slave hierarchy, but interleaving in the equivalent device hierarchy is not impossible and is therefore not excluded.

The most notable difference is in time synchronization. In this embodiment it is required that sensors will be transmitting without a master. They might for example take a certain period of time after start up for listening only but eventually they will start transmitting more or less regularly until they are shut down. In a preferred embodiment, the sensors, during the listening period after being powered up, listen to each others data packets and temporally synchronize their timing schemes by taking the next free time slot as their transmission slot. This way all sensors in the range of each other will by default synchronize among themselves and transmit simultaneously in their individual broadcast time-slots until a master commands them otherwise. Thus, signal from only one sensor at a time is received by a monitoring device.

A listening-only monitoring device can therefore robustly pick up the transmissions of all the sensors. This way the monitoring device can be made smaller and use lower peak current than a regular device with transmit capabilities, thus it can be implemented in a small wrist-watch type instrument running from a coin-cell battery.

The mode of operation of the transceiver device, i.e. herein discussed can be entered for example by pre-programming, by selection of the user through user interface means of the device or by a time-out from a (failed) another mode of operation. For example, a device may have the master-slave mode as a default but in the absence of a master during a predefined period, it may decide to go into the self-organizing mode.

Interfering Devices

Regardless of the hierarchy used, it is preferable that the system is capable of handling new devices, transceivers and/or masters, interfering with the system. They may be allowed to join the system or they may be denied. Either way, they need to be synchronized with the existing system, otherwise they might interfere communications therein. Indeed, it is likely to happen that unsynchronized sensors and other masters come into the range of the wireless link of an existing system at a random time. These can be devices that the user wants to include in his or her system (e.g a new gas tank during a dive) or they can be another users devices belonging to another system.

In most cases, a transmitter closest to the receiver will most likely override other transmitters transmitting at the same time and a transmitter further away will not corrupt transmission of one nearby. If a master, however, detects interference and is able to catch the ID of the interfering device, it may be adapted to request resynchronization and address resolution of the neighboring network. It can request this from the interfering sensor, which will relay the request to its master, if present. If the other master has a larger unique ID number, it will obey, otherwise it will be the senior master and issue back a synchronization command and an address change. If the new transceiver has no master, it may be adapted to directly obey.

In rare cases another user's device might be transmitting using same address and with same timing as in an existing system. The exact identity of a device can however be determined by querying a full unique ID (e.g. 32 bit ID) of the device. Therefore, according to one embodiment, to avoid data confusion, the transceivers are adapted to periodically send their full unique ID along with the normal data.

According to one embodiment, the master device is adapted to request the user's approval before allowing new devices to joining the system. The master may also be allowed to directly accept or deny new devices.

Packet Types

The abovementioned functions of the transceiver devices, monitor devices and the system can be implemented using four data packet types: One way packet, Handshake packet, ACK packet and Time synchronization packet. The simplest packet is a one way packet.

It is used for low power transmission of non-critical messages, such as frequent reporting of sensor readings. The recipient(s) are not expected to report back.

UWC Messages

Tank Pressure Message (from sensor)

| Byte | Function | | |
|---|---|---|---|
| 0 | Message ID | 8 bits | Tank pressure message ID = 0xC8 |
| 1 | Flags | 8 bits | bit 0 . . . 3: battery level 0-15 |
| 2 . . . 3 | Pressure | 16 bits | Unit 1/64 bar, Range 0 . . . 1023 bar |
| 4 . . . 7 | Sensor ID | 32 bits | Optional - Unique Sensor ID |
| 4 or 8 | Check sum | 8 bits | 8 bit sum of all bytes (incl. this) must be zero |

Hello Message (from sensor)

| Byte | Function | | |
|---|---|---|---|
| 0 | Message ID | 8 bits | Hello message ID = 0xC4 |
| 1 | Sensor type | 8 bits | Sensor type: 0 = tank pressure sensor |
| 2 . . . 5 | Sensor ID | 32 bits | Unique Sensor ID |
| 6 | Check sum | 8 bits | 8 bit sum of all bytes (incl. this) must be zero |

Bye Message (from sensor)

| Byte | Function | | |
|---|---|---|---|
| 0 | Message ID | 8 bits | Bye message ID = 0xC5 |
| 1 | Reason | 8 bits | Reason code, 0 = power off by user<br>1 = auto shutdown (timeout)<br>2 = out of battery |
| 2 . . . 5 | Sensor ID | 32 bits | Unique Sensor ID |
| 6 | Check sum | 8 bits | 8 bit sum of all bytes (incl. this) must be zero |

Sensor Name Message (from sensor)

| Byte | Function | | |
|---|---|---|---|
| 0 | Message ID | 8 bits | Sensor Name Message ID = 0xC6 |
| 1 . . . 4 | Sensor ID | 32 bits | Unique Sensor ID |
| 5 . . . 21 | Name | 1-16 bytes | Sensor Name string 1-16 characters |
| 6 to 22 | Check sum | 8 bits | 8 bit sum of all bytes should be zero |

Address and Timing Change Command (from master)

| Byte | Function | | |
|---|---|---|---|
| 0 | Message ID | 8 bits | Address Change Command ID = 0x91 |
| 1 | New address | 6 bits | bit 0 . . . 5: sensor address 0 . . . 63 |
| 2 | New timing | 6 bits | bit 0 . . . 1: TX rate<br>bit 2 . . . 3: RX rate<br>bit 4 . . . 5: Interleave |
| 3 . . . 6 | Sensor ID | 32 bits | Unique Sensor ID |
| 7 . . . 10 | Master ID | 32 bits | Unique Master ID |
| 11 | Check sum | 8 bits | 8 bit sum of bytes 0 . . . 11 should be zero |

Resynchronization Command (from master)

| Byte | Function | | |
|---|---|---|---|
| 0 | Message ID | 8 bits | Resynchronization Command ID = 0x92 |
| 1 . . . 2 | Time adjust | 16 bits | 0 . . . 32767 adj. added to 32768 Hz time code |
| 3 . . . 6 | Master ID | 32 bits | Unique Master ID |
| 7 | Check sum | 8 bits | 8 bit sum of bytes 0 . . . 7 should be zero |

Set Sensor Name Command (from master)

| Byte | Function | | |
|---|---|---|---|
| 0 | Message ID | 8 bits | Set name Command ID = 0x93 |
| 1 . . . 4 | Sensor ID | 32 bits | Unique Sensor ID |
| 5 . . . 20 | Name | 1-16 bytes | Sensor Name string 1-16 characters |
| 6 to 21 | Check sum | 8 bits | 8 bit sum of all bytes should be zero |

Request Sensor Name Command (from master)

| Byte | Function | | |
|---|---|---|---|
| 0 | Message ID | 8 bits | Request name Command ID = 0x94 |
| 1 | Check sum | 8 bits | 8 bit sum of all bytes should be zero |

Example Specifications of the System

In a typical setup, the transceivers have a frequent transmission interval of 6-120 messages per minute (0.1-2 messages per second), determined by their timing schemes. There may be e.g. 10-40 time slots per second preconfigured.

In an exemplary configuration, there are 20 slots in total per second of which 16 slots are for sensors transmissions, 3 slots for master's transmissions and 1 broadcast slot for new sensors announcing themselves. In a non-interleaved operation there may be 16 simultaneous sensors at 1/1 s update rate (non-interleaved), 32 simultaneous sensors at 1/2 s update rate, 64 simultaneous sensors at 1/4 s or slower update and 128 simultaneous sensors at 1/8 s or slower update. The number of simultaneous sensors may be limited by the number of sensor addresses, too. In an exemplary dynamic addressing scheme, there are 64 sensor addresses and 8 master addresses with automatic allocation. In addition, each device has a unique ID (e.g. 32 bit ID). There is preferably also an address and/or timing conflict detection and resolution mechanism built-in to the system.

Example Transceiver Devices and Sensors of the System

Next, potential devices which can take advantage of the invention are described in the form of exemplary diving-related sensor units within the meaning of the present invention, which may be connected or integrated with the present transceiver device and parameters which may be communicated in the data packets of the invention. Even if not specifically mentioned, each sensor may be adapted to communicate a header with general information of the sensor or device, such as address, battery level, or status or error flags. The devices may be separate or integrated into other devices or together, whereby they in fact form "services" within a single device. For example, a pressure sensor device may have an integral battery voltage sensor, the values of which are communicated in the same massage. Naturally, the values may be communicated also in different messages through a single or separate communication units.

According to one embodiment already discussed above, the unit is a tank pressure sensor capable of measuring and communicating gas pressure in a tank, such as a gas cylinder (bottle).

According to one embodiment, the device is a rebreather monitor unit capable of measuring and communicating one or more oxygen partial pressures.

According to one embodiment, the device is a rebreather control unit capable of setting and communicating a set point for a rebreather. The set point may be communicated only when re-set by a user. (A control device like this is also considered a sensor since it needs to know its own relevant value).

According to one embodiment, the device is a display unit, such as HUD mask. Such mask may directly measure or receive from other devices and communicate one or more of the following parameters: tank pressure, depth, dive time, no-dec time, time to surface, ceiling, safety stop countdown, ascending speed, oxygen partial pressure, heading, bearing or heart rate.

According to one embodiment, the device is a remote control unit capable of producing and communicating a remote control message.

According to one embodiment, the device is an underwater navigation unit capable of measuring and communicating one or more of the following: heading, bearing, latitude, longitude, depth, remaining true distance to waypoint or destination, remaining vertical distance to waypoint or destination, speed.

According to one embodiment, the device is a communication unit capable of producing and communicating a message or message ID.

According to one embodiment, the device is a battery status monitoring unit capable of measuring and communicating battery voltage and/or battery status.

According to one embodiment, the device is a proximity sensing unit capable of measuring and communicating distance to a target.

According to one embodiment, the device is a heart rate sensor unit capable of measuring and communicating heart rate.

According to one embodiment, the device is a geocache target unit capable of detecting a geocache finder unit or the presence of a diver or a geocache finder unit capable of detecting a geocache target unit.

The invention claimed is:

1. An underwater transceiver device comprising;
a sensor unit or a sensor connection for an external sensor unit for providing a sensor value, and
a communication unit functionally connected to the sensor unit or sensor connection, said communication unit having, means for wirelessly transmitting the sensor value to at least one out of a number of other underwater devices, in a self-organized network of underwater transceiver devices, as data packets according to a transmission timing scheme comprising a set of time slots allowed for transmitting, and
means for wirelessly receiving signals transmitted by said other underwater devices and further comprising a non-transitory computer readable medium having stored thereon a set of computer executable instructions for causing the transceiver device to carry out the steps of:
listen to signals containing data packets from said other underwater devices in said self-organized network, and
selecting and reserving a free time slot in said transmission timing scheme for transmitting based on the time of receipt of data packets from said underwater devices in order to synchronize said underwater transceiver device with said other underwater devices in said self-organize network.

2. The transceiver device according to claim 1, wherein the selection of a free time slot based on the time of receipt and the content of received data packets from said other underwater devices.

3. The transceiver device according to claim 1, wherein said transmission timing scheme comprises a preconfigured set of cyclically repeating time slots allowed for transmitting.

4. The transceiver device according to claim 1, wherein said data packets comprise at least sensor identification information and sensor value information.

5. The transceiver device according to claim 1, wherein the timing scheme comprises a time slot reserved for receiving data packets of other underwater devices so as to allow for of joining new underwater devices to said self-organized network.

6. The transceiver device according to claim 1, comprising said non-transitory computer readable medium having stored thereon a set of computer executable instructions for causing the transceiver device to, when receiving data packets from other devices, carry out the further steps of:
adjusting the timing scheme according to instructions contained in a data packet of a first type, if a data packet of a predefined first type is received,
in the absence of data packets of said predefined first type and upon receipt of data packets of a predefined second type at a first time slot, adjusting the timing scheme for transmission of a data packet to take place at a second time slot different than said first time slot, and
starting transmission according to the adjusted timing scheme.

7. The transceiver device according to claim 1, wherein the means for transmitting and the means for receiving are adapted to operate using magnetoinductive waves.

8. The transceiver device according to claim 1, wherein the communication unit is adapted to transmit and receive said data packets at a constant carrier frequency.

9. The transceiver device according to claim 1, wherein said sensor unit is a diving gas pressure sensor unit and said sensor value is a gas pressure value.

10. The transceiver device according to claim 1, wherein said sensor unit is a location sensor unit and said sensor value is a location value, said sensor unit is a proximity sensor unit and said sensor value is a distance value, said sensor unit is a heartbeat sensor unit and said sensor value is a heartbeat or heart rate value, said sensor unit is an ambient pressure sensor unit and said sensor value is an ambient pressure value or depth value, or said sensor unit is a geocache detector and said sensor value is a geocache detection signal.

11. The transceiver device according to claim 1, the device comprising a memory unit with a memory portion for storing wirelessly reconfigurable operation settings.

12. An underwater communication system, the system comprising
at least two underwater transceiver devices, each transceiver device having means for wirelessly transmitting a sensor value to another underwater transceiver device in a self-organized network of underwater transceiver devices as data packets according to a transmission timing scheme comprising a set of time slots allowed for transmitting, means for wirelessly receiving data packets transmitted by another transceiver device, and a non-transitory computer readable medium having stored thereon a set of computer executable instructions for causing a transceiver device in said self-organized network to listen to signals containing data packets from other underwater devices and to select and reserve a free time slot in said transmission timing scheme for transmitting data packets based on a time of receipt of data packets from said other underwater devices in order to synchronize said transceiver device with said other underwater devices in said self-organized network and
a monitoring device comprising means for listening to the data packets of the transceiver devices in said self-organized network during repeating listening periods.

13. The communication system according to claim 12, wherein
a timing scheme of the transceiver devices comprises a limited number of transmission time slots and said transceiver devices are arranged to adjust their timing schemes to occupy successive transmission time slots, and
said monitoring device is adapted to listen to the data packets of all the occupied transmission time slots during a single listening period.

14. The communication system according to claim 13, wherein said monitoring device is adapted to listen only to occupied successive transmission time slots in at least majority of the listening periods.

15. The communication system according to claim 13, wherein said monitoring device is adapted to listen over all the time slots.

16. The communication system according to claim 13, wherein the transceiver devices are capable of transmitting their data packets in an interleaved mode of operation and not on every listening period, to allow more transceiver devices than the number of time slots present in a timing scheme to join the system.

17. The communication system according to claim 13, wherein the monitoring device is adapted to listen to data packets during a plurality of listening periods according to a temporal listening scheme and otherwise to be in a resting state consuming less energy between the listening periods than during the listening periods.

18. The communication system according to claim 13, wherein the transceiver devices and/or the monitoring device comprise means for detecting a new transceiver device transmitting during the listening periods and for allowing a new transceiver device to join the timing scheme of the existing transceiver devices in said self-organized network.

19. The communication system according to claim 13, wherein the monitoring device is a wristop diving computer or diving mask with an integrated display unit for displaying the sensor data provided by the transceiver devices.

20. A method of communication of sensor data in an underwater communication system comprising at least two underwater transceiver devices forming a self-organized network of underwater devices, each being arranged to receive sensor data from at least one sensor unit integrated or functionally connected to the transceiver device and each having a programmed repeating timing scheme with a limited number of time slots allowed for transmission of data packets, the method comprising
powering on the underwater transceiver devices,
transmitting a signal from at least a first underwater transceiver device as a data packet according to a transmission timing scheme of said first transceiver device,
receiving said data packet in a second underwater transceiver device,
synchronizing a transmission timing scheme of the second underwater transceiver device with the transmission timing scheme of the first underwater transceiver device based on the time of receipt of the data packet from the first underwater transceiver device by selecting and reserving a free time slot in said transmission timing scheme such that the first and second underwater transceiver devices use different time slots for transmission of data packets in said self-organized network of underwater devices, and
transmitting sensor data containing signals from said first and second transceiver devices according to their synchronized transmission timing schemes, so that their data packets form an ordered data stream.

21. The method according to claim 20, wherein the receiver device is receiving said sensor data containing signals as an ordered data stream formed of the data packet of the first and second transceiver devices in said different time slots.

* * * * *